US005499624A

United States Patent [19]

Krüger et al.

[11] Patent Number: 5,499,624

[45] Date of Patent: Mar. 19, 1996

[54] BREATHING MASK WITH FACE-CONTACT ACTUATED OVERPRESSURE GENERATING SWITCH

[75] Inventors: Edmund Krüger; Thomas Neuber, both of Lübeck, Germany

[73] Assignee: Drägerwerk AG, Lübeck, Germany

[21] Appl. No.: 140,764

[22] Filed: Oct. 21, 1993

[30] Foreign Application Priority Data

Nov. 5, 1992 [DE] Germany .......................... 42 37 294.1

[51] Int. Cl.$^{6}$ ............................ A62B 7/04; A62B 18/02; A62B 18/10; F16K 31/26

[52] U.S. Cl. ............................... 128/204.26; 128/205.25; 128/204.27; 128/206.24

[58] Field of Search ......................... 128/205.25, 204.18, 128/204.26, 200.24, 201.28, 202.22, 202.27, 204.27, 205.21, 205.23, 205.24, 206.15, 206.21, 206.24, 207.12

[56] References Cited

U.S. PATENT DOCUMENTS

| | | | |
|---|---|---|---|
| 3,019,788 | 2/1962 | Hughes | 128/205.25 |
| 3,073,301 | 1/1963 | Hay et al. | 128/205.25 |
| 3,186,407 | 6/1965 | Morrison | 128/205.25 |
| 3,316,907 | 5/1967 | Goupil | 128/205.25 |
| 3,629,868 | 12/1971 | Greenlee | 128/205.25 |
| 4,119,097 | 10/1978 | Spector | 128/205.25 |
| 4,889,113 | 12/1989 | Pelloux-Gervais et al. | 128/205.25 |
| 5,007,421 | 4/1991 | Stewart | 128/205.25 |

FOREIGN PATENT DOCUMENTS

| | | | |
|---|---|---|---|
| 0091843 | 5/1987 | European Pat. Off. . | |
| 2842247 | 4/1980 | Germany . | |
| 3539668 | 11/1989 | Germany . | |
| 1317172 | 5/1973 | United Kingdom | 128/205.25 |

*Primary Examiner*—Kimberly L. Asher

*Attorney, Agent, or Firm*—McGlew and Tuttle

[57] ABSTRACT

A breathing mask (1) with overpressure in the mask interior space (26) with a demand oxygen system (8) at a connection piece (32) of the breathing mask, with a switching member (11) at the demand oxygen system for generating the overpressure, and with an actuating element (23) acting on the switching member at the connection piece for switching on the overpressure. Switchover to overpressure operation is possible only when the breathing mask has been put on by providing an actuating element (23) led out of the connection piece (32) at a boundary area (6) between the breathing mask (1) and the face of a mask user (4) such that it is brought into the switched-on position when the breathing mask is put on by interaction with a portion of the surface of the face of the mask user (4).

6 Claims, 3 Drawing Sheets

BREATHING MASK WITH FACE-CONTACT ACTUATED OVERPRESSURE GENERATING SWITCH

FIELD OF THE INVENTION

The present invention pertains to a breathing mask with overpressure in the interior space of the mask with a demand oxygen system at a connection piece of the breathing mask, with a switching member on the demand oxygen system for generating the overpressure, and with an actuating element acting on the switching member at the connection piece for switching on the overpressure.

BACKGROUND OF THE INVENTION

A demand oxygen system for generating overpressure in the interior space of a mask has become known from EP-B 91 843. The prior-art demand oxygen system is provided with an adapter connection piece, which can be attached to a connection piece of a breathing mask. The demand oxygen system consists of a switching member for generating the overpressure, which switching member is connected to a sensor, which acts as an actuating element and triggers the switchover to overpressure respiration when the adapter piece with the sensor is inserted into the connection piece.

It is disadvantageous in the prior-art demand oxygen system that the switchover to overpressure respiration is performed regardless of whether the user of the mask has put on the breathing mask or not. If the demand oxygen system is inserted into the connection piece and switched to overpressure operation when the breathing mask has not been put on, pressurized gas escapes continuously via the metering valve of the demand oxygen system into the environment, which may lead to premature depletion of the respiration gas reserve.

A mouthpiece valve for gas masks and breathing equipment, which consists of a valve housing and a tube displaceable in the valve housing as an actuating element, has become known from DE 28 42 247. When the mouthpiece located at the valve housing is put on, the tube is displaced in the direction of the mouthpiece, as a result of which the passage for the respiration gas is released. The prior-art mouthpiece valve is used only to interrupt the respiration gas supply when the mouthpiece has been removed. It is disadvantageous in the prior-art mouthpiece valve that the tube always must be held against the full force of a restoring spring in the open position of the valve.

A lung-controlled diaphragm valve for breathing masks with a switching member in the form of a rocker arm, which is pretensioned by spring elements and can be brought from a stable switched-off position into the operating position for the overpressure respiration by pressure on a carrier acting as an actuating element, has become known from DE-C 35 39 668.

It is disadvantageous in the prior-art diaphragm valve that the switchover from the switched-off position to the operating position can be performed regardless of whether the breathing mask has been put on or not, and it can happen that the user of the mask neglects to bring the rocker arm into the switched-off position. Respiration gas is lost unused in this case.

SUMMARY AND OBJECTS OF THE INVENTION

The basic object of the present invention is to improve a breathing mask with a demand oxygen (breathing gas) system such that the switchover to overpressure operation is effective only with the breathing mask put on.

This object is attained by the actuating element being led out of the connection piece at a boundary area between the breathing mask and the face of a mask user such that it will be brought into the switched-on position when the breathing mask is put on due to interaction with a portion of the surface of the mask user's face.

The advantage of the present invention is essentially the fact that the demand oxygen system is switched to overpressure respiration only when the breathing mask has been put on, by engaging a portion of the surface of the mask user's face with an actuating element of the demand oxygen system. The demand oxygen system is therefore prevented from being switched on accidentally or prematurely. The actuating element may be designed, e.g., as a pin, which is deflected, e.g., axially displaced, when the breathing mask is put on, and the switching member thus actuates the demand oxygen system. It is also possible, however, to provide as the actuating member an electromechanical switch, which acts on the switching member generating the overpressure via a control circuit.

Advantageous embodiments of the present invention are described in the subclaims.

It is advantageous to use a depression of the sealing edge of the breathing mask as the boundary area between the breathing mask and the mask user's face, the portion of the facial surface triggering the switchover being the mask user's chin area. The chin area is suitable because the respiration gas feed unit with the demand oxygen system is also located in the mouth or chin area, and deformations of the sealing edge in the chin area can be transmitted particularly well to the actuating element in the form of a change in displacement.

The switching member is advantageously designed as a rocker arm mounted in a first hinge, and the actuating element is advantageously designed as a sensor mounted in the manner of a rocker in a second hinge, and they are tensioned in relation to one another by means of a coil spring acting on the rocker arm and of a tension spring acting on the sensor. A change in displacement can be transmitted particularly well to the sensor mounted in a rocker-like manner when it is arranged under the chin. The actuating force transmitted to the mask user can be set by a corresponding positioning of the second hinge at the sensor such that it will not be felt to be disturbing. The sensor, the rocker arm, and the springs are advantageously attached to a bearing block at the connection piece.

In the area of the first hinge, the rocker arm advantageously has a right-angle bend area, on which the sensing tip of the sensor lies in the switched-off position of the demand oxygen system. If the sensor is deflected by the mask user's chin in the operating position, i.e., when the breathing mask is being put on, the sensing tip slides out of the right-angle bend area of the rocker arm, as a result of which the rocker arm is pivoted around the first hinge under the action of the coil spring acting on it, and admission of gas via the inlet valve of the demand oxygen system is possible. When the breathing mask is removed, the sensing tip slides back into the right-angle bend area of the rocker arm due to the interaction of the tension spring and the coil spring, as a result of which the rocker arm resumes the stable switched-off position. A defined switchover point between the switched-off position and the operating position is obtained due to the presence of a right-angle bend area at the rocker arm.

The rocker arm and a valve control lever influencing the demand oxygen system are advantageously connected in a lug of a carrier actuating the diaphragm of the demand oxygen system in an articulated manner.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DETAILED DESCRIPTION OF THE PREFERRED EMBODIMENT

Figure 1:
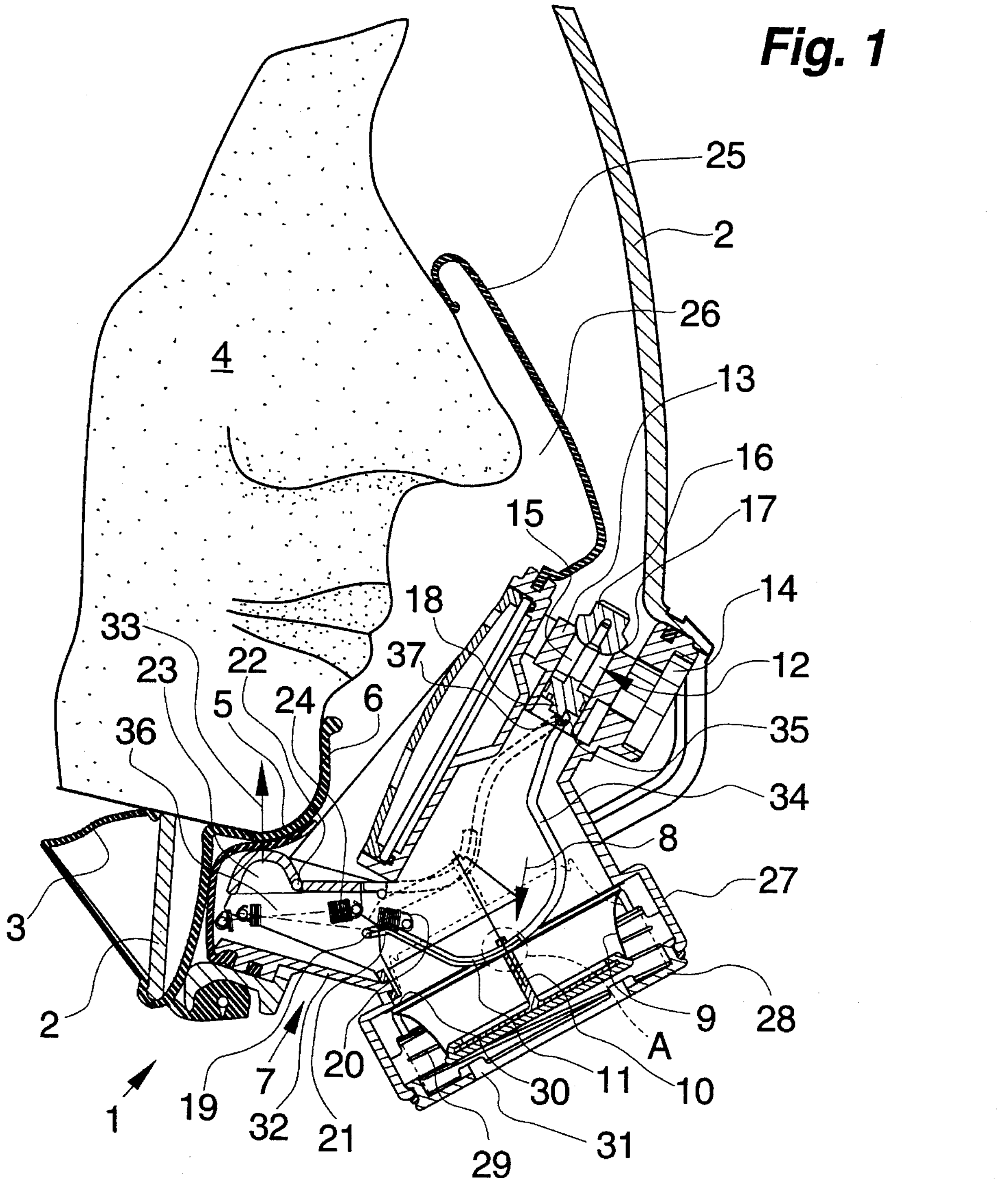
FIG. 1 is a sectional view of a breathing mask with a demand oxygen system.

FIG. 1 shows a partial view of a longitudinal section of a breathing mask 1 with a mask body 2 and with a sealing edge 3. The sealing edge 3 is attached to the mask body 2 and is in contact with the face of a mask user 4 and has a depression 6 in a chin area 5. A vane housing 7, which surrounds a demand (breathing gas) system 8 with a diaphragm 9, a carrier 10, a rocker arm 11, and an inlet valve 12. The vane housing 7 is inserted into the mask body 2. In the area of the inlet valve 12, the vane housing 7 is formed of an inlet valve housing 13, with a pressurized gas connection 14, through which the respiration gas enters a primary pressure chamber 15 in the inlet valve housing 13. The inlet vane 12 consists of a valve body 16, which lies on a valve seat 17 and with a compensation piston 18 for admission pressure regulation. The compensation piston 18 is connected to the valve body 16 and is actuated by a valve control lever 34. The valve control lever 34 is rotatably mounted in a hinge 35 within the inlet vane housing 13 and has, in the area of the hinge 35, a cam disk 37, by which the compensation piston 18 is actuated during the pivoting movement of the valve control lever 34. The valve control lever 34 and the rocker arm 11 are guided together in the carrier 10 in an articulated manner. The rocker arm 11 is rotatably mounted in a first hinge or switching member hinge 19 at a bearing block 36 and is pretensioned by means of a coil spring 20. The coil spring 20 is mounted at the rocker arm 11 such that the rocker arm 11 can be switched from an operating position, in which the inlet valve 12 can be actuated by the diaphragm 9, into a stable switched-off position, in which the inlet valve 12 is closed. To perform the switchover function, the rocker arm 11 has an angle bend area 21 in the area of the first hinge 19. A sensor 23, which is in contact with the chin area 5 of the sealing edge 3, on the one hand, and acts on the rocker arm 11, on the other hand, is also mounted rotatably at the bearing block 36 in a second hinge or scissor hinge 22 and is pretensioned in relation to the rocker arm 11 by means of a tension spring 24. An inner mask 25, which is in contact with the face of the mask user 4 and covers the inside of the depression 6 in the area of the sealing edge 3, is buttoned into the valve housing 7. The inner mask 25 surrounds as a secondary pressure chamber a mask interior space 26, which is delimited by the diaphragm 9 in the area of the vane housing 7. With the breathing mask 1 put on, the sensor 23 is supported on the underside of the chin of the mask user 4 via the inner mask 25 and the depression 6.

The diaphragm 9 of the demand oxygen system 8 is fastened in a diaphragm housing 27 with a diaphragm cover 28, which are also parts of the valve housing 7. The diaphragm 9 is pressed by a diaphragm spring 29 against a diaphragm valve seat 30 at the diaphragm housing. The diaphragm cover 28 is provided with expiration openings 31. In the direction of the inner mask 25, the diaphragm housing 27 is joined by a connection piece 32, which is also part of the valve housing 7 and contains the bearing block 36.

FIG. 1 shows the rocker arm 11 and the diaphragm 9 of the demand oxygen system 8 during the transition from the switched-off position (solid line) into the operating position when the breathing mask is put on (broken line). The inlet valve 12 can be opened via the diaphragm 9 in the operating position due to a reduction in pressure being generated by the inhalation by the mask user 4, due to the diaphragm 9 being deflected and rotated in the hinge 35 via the carrier 10 of the valve control lever 34 such that the valve body 16 is lifted off from the valve seat 17 due to rotation of the cam disk 37, which is connected to the valve control lever 34, and respiration gas flows from the primary pressure chamber 15 into the mask interior space 26. The valve control lever 34 is also shown by broken line in the operating position. The inlet valve 12 will again close as the pressure in the mask interior space 26 increases. An increase in pressure takes place in the mask interior space 26 during expiration, as a result of which the diaphragm 9 is pressed against the diaphragm spring 29 into the open position, and the expiration gas is discharged into the environment via the diaphragm valve seat 30 and the exhalation openings 31.

When the breathing mask i is removed, the sensor 23 performs a rotation around the second hinge 22 and moves in the direction of the arrow 33, as a result of which the rocker arm 11 jumps over into the stable switched-off position, in which the inlet valve 12 is shut off and the flow of respiration gas into the mask interior space 26 is interrupted (solid line of the rocker arm 11, the diaphragm 9, and the valve control lever 34).

Figure 2:
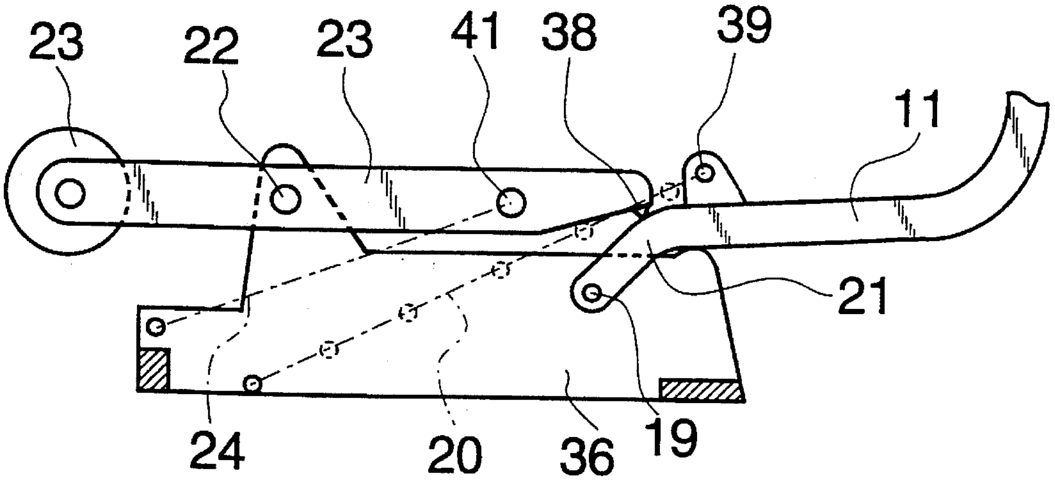
FIG. 2 is a schematic representation of the overpressure switch-on device.
Figure 3:
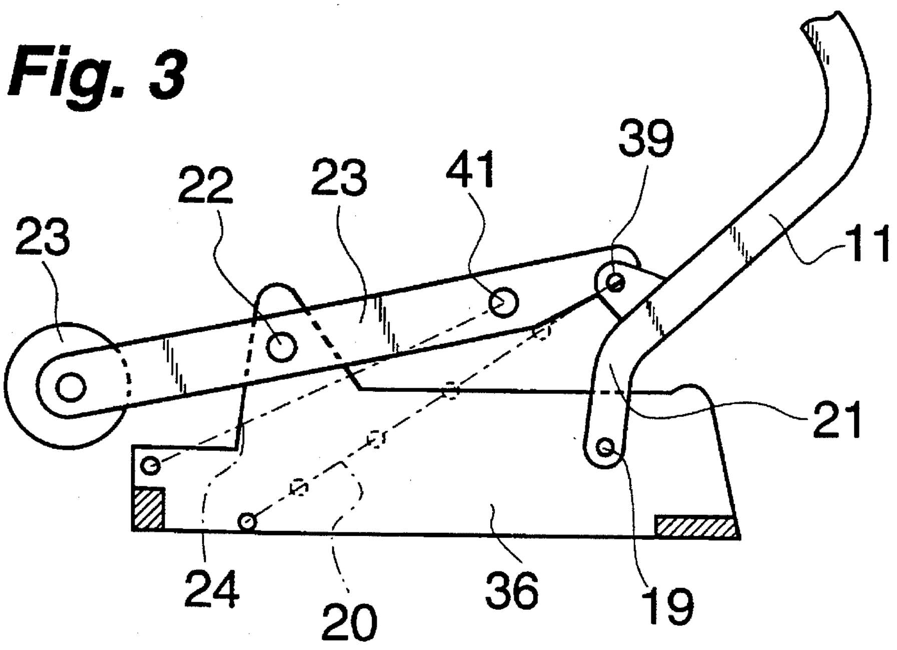
FIG. 3 is a schematic representation of the overpressure switch on device according to FIG. 2 in the operating position.

The cooperation of the sensor 23 with the rocker arm 11 is illustrated in FIGS. 2 and 3. Identical components are designated by the same reference numerals as in FIG. 1.

FIG. 2 shows the bearing block 36 with the sensor 23 and the rocker arm 11, which are pivotable around the hinges 22, 19 and are pretensioned against each other by the springs 20, 24 attached to the bearing block 36. The coil spring 20 is attached to a first fastening point 39 of the rocker arm 11, and the tension spring 24 is attached to a second fastening point 41 of the sensor. In the position shown in FIG. 2, the sensor 23 is in the switched-off position, and the sensing tip 38 is in contact with the right-angle bend area 21 of the rocker arm 11. Beginning from the first hinge 19, the right-angle bend area 21 extends, over up to ca. 70% of its total length, between the first hinge 19 and the first fastening point 39. The right-angle bend area 21 is used to ensure a defined switchover point between the switched-off position and the operating operation.

FIG. 3 shows the sensor 23 and the rocker arm 11 in the operating position, in which the sensor 23 has been deflected by the mask user's chin when the breathing mask was put on.

The sensing tip 38 now slides out of the right-angle bend area 21 along the rocker arm 11, as a result of which the rocker arm is pivoted upward by the coil spring 20, and the admission of gas via the inlet valve 12 (FIG. 1) is possible. When the breathing mask is removed, the sensor 23 is released, and the sensing tip 38 slides in the direction of the right-angle bend area 21 due to the interaction of the springs 20, 24, as a result of which the rocker arm 11 will resume its stable switched-off position. More accurately, the tension spring 23 is dimensioned such that it returns the sensor 23 into the switched-off position against the action of the coil spring 20 when the breathing mask 1 has been removed.

Figure 4:
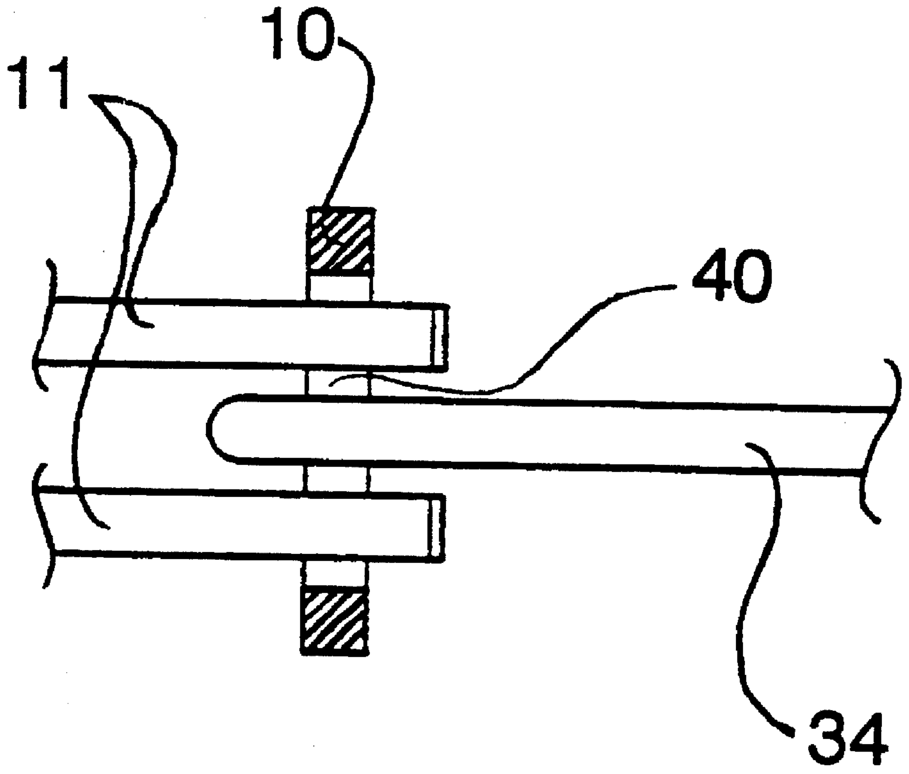
FIG. 4 is a partial view A according to FIG. 1 with view to the carrier.

FIG. 4 illustrates the articulated connection of the rocker arm 11 and of the valve control lever 34 to the carrier 10. The carrier 10 has, in its rod-shaped shaft, a lug 40, through which both the rocker arm 11 and the valve control lever 34 are led and follow the movement of the diaphragm 9.

While a specific embodiment of the invention has been shown and described in detail to illustrate the application of the principles of the invention, it will be understood that the invention may be embodied otherwise without departing from such principles.

What is claimed is:

1. A breathing mask, comprising:

a mask body;

a connection piece including a demand gas system for providing gas to an interior space of the breathing mask on demand said connection piece being inserted into said mask body;

overpressure switching means connected to said demand gas system for switching said demand gas system from a stable switched off position into a switched on position for generating an overpressure in said mask interior space;

actuating element means acting on said switching means at said connection piece for switching to overpressure generation in said switched-on position, said actuating element means including an actuating element extending out or said connection piece to a boundary area between said breathing mask body and a face of a mask user, said actuating element means for moving said switching means to said switched-on position when the breathing mask is donned by the wearer upon interaction between a portion of the surface of the face of the mask user and said boundary area, said actuating element being designed as a sensor mounted via a sensor hinge for movement of said sensor in a rocker-like manner, said switching member being designed as a rocker arm mounted via a switching member hinge, each of said sensor and rocker arm being tensioned in relation to one another by means of a tension spring acting on said sensor and a coil spring acting on said rocker arm.

2. A breathing mask according to claim 1, wherein:

said boundary area is formed by a depression of a sealing edge of the breathing mask body and said actuating element being adapted to be actuated by the chin area of the mask user.

3. A breathing mask according to claim 1, wherein:

said rocker arm has an angle bend area adjacent to an area of said rocker arm hinge, said sensor having a sensor tip in contact with said angle bend area in said switched-off position of said demand gas system.

4. A breathing mask according to claim 3, wherein:

said connection piece includes an inlet valve with a valve control lever, said demand breathing gas system including a carrier with a lug for actuating a diaphragm, said rocker arm and said valve control lever being connected in an articulated manner to said lug.

5. A breathing mask according to claim 1, wherein:

said connection piece includes an inlet valve with a valve control lever, said demand gas system including a carrier with a lug for actuating a diaphragm, said rocker arm and said valve control lever being connected in an articulated manner to said lug.

6. A breathing mask, comprising: a mask body, said mask body including a portion in contact with a face of a mask user, when said mask body is applied to the face of the mask user; a connection piece including a demand gas system including an inlet valve, said connection piece being fixed relative to said mask body; overpressure switching means connected to said demand gas system for switching said demand gas system from a stable switched off position into a switched on position, for generating an overpressure in said mask interior space; and a sensor acting on said switching means for switching to overpressure generation in said switched-on position, said sensor extending from said switching means to adjacent said contact portion, said sensor for moving said actuator means to said switched-on position when said breathing mask is donned by the mask user upon said sensor detecting the surface of the face of the mask user at said contact portion.

* * * * *